US011188131B2

(12) United States Patent
Chang et al.

(10) Patent No.: US 11,188,131 B2
(45) Date of Patent: Nov. 30, 2021

(54) CALCULATION BOARD POWER STAGE CIRCUIT, AND CALCULATION BOARD

(71) Applicant: Bitmain Technologies Inc., Beijing (CN)

(72) Inventors: Xin Chang, Beijing (CN); Yanhong Qiu, Beijing (CN); Tong Zou, Beijing (CN)

(73) Assignee: Bitmain Technologies Inc., Beijing (CN)

( * ) Notice: Subject to any disclaimer, the term of this patent is extended or adjusted under 35 U.S.C. 154(b) by 26 days.

(21) Appl. No.: 16/825,135

(22) Filed: Mar. 20, 2020

(65) Prior Publication Data
US 2020/0218321 A1 Jul. 9, 2020

Related U.S. Application Data

(63) Continuation of application No. PCT/CN2018/107104, filed on Sep. 21, 2018.

(30) Foreign Application Priority Data

Sep. 21, 2017 (CN) .......................... 201721222046.3

(51) Int. Cl.
*G06F 1/26* (2006.01)
*G06F 1/18* (2006.01)
(Continued)

(52) U.S. Cl.
CPC ................ *G06F 1/26* (2013.01); *G06F 1/188* (2013.01); *H02M 3/003* (2021.05); *H02M 3/00* (2013.01); *H02M 3/155* (2013.01)

(58) Field of Classification Search
CPC .......... G06F 1/26; G06F 1/188; H02M 3/003; H02M 3/155; H02M 3/00; H02M 7/003; H02M 3/1588
See application file for complete search history.

(56) References Cited

U.S. PATENT DOCUMENTS 6,460,168 B1 * 10/2002 Yamamoto .......... H02M 3/1588
  323/234
8,008,953 B1 * 8/2011 Brumett, Jr. ......... H03K 17/166
  327/109

(Continued)

FOREIGN PATENT DOCUMENTS

CN 203691210 U 7/2014
CN 104283406 A 1/2015
(Continued)

OTHER PUBLICATIONS

International Search Report and Written Opinion of the International Searching Authority dated Dec. 27, 2018 in corresponding International application No. PCT/CN2018/107104; 10 pages.

(Continued)

*Primary Examiner* — Kyle J Moody
(74) *Attorney, Agent, or Firm* — Maier & Maier, PLLC (57) ABSTRACT

A power stage circuit and a calculation board. The power stage circuit includes an input circuit and an output circuit. The input circuit and the output circuit are electrically connected. The power stage circuit also includes a plurality of package pins. The plurality of package pins are respectively connected to the input circuit, the output circuit, and a power supply package unit.

20 Claims, 6 Drawing Sheets

(51) Int. Cl.
*H02M 3/00* (2006.01)
*H02M 3/155* (2006.01)

(56) References Cited

U.S. PATENT DOCUMENTS

| | | | |
|---|---|---|---|
| 9,351,354 B2 | 5/2016 | Elferich et al. | |
| 10,027,229 B2* | 7/2018 | Yamada | H02M 3/158 |
| 2002/0093094 A1 | 7/2002 | Takagawa et al. | |
| 2004/0227547 A1 | 11/2004 | Shiraishi et al. | |
| 2007/0226557 A1 | 9/2007 | Fuseya | |
| 2008/0100278 A1* | 5/2008 | Salato | H02M 3/1588 323/318 |
| 2010/0308654 A1* | 12/2010 | Chen | H02M 3/158 307/31 |
| 2012/0049811 A1* | 3/2012 | Wakii | H02M 3/1588 323/271 |
| 2015/0341994 A1* | 11/2015 | Wang | H05B 45/20 315/185 R |
| 2018/0234015 A1* | 8/2018 | Degen | H02M 3/158 |

FOREIGN PATENT DOCUMENTS

| | | |
|---|---|---|
| CN | 106407008 A | 2/2017 |
| CN | 207603443 U | 7/2018 |
| JP | 3158604 U | 4/2010 |
| RU | 2588580 C2 | 7/2016 |

OTHER PUBLICATIONS

Notice of Allowance dated Jun. 29, 2020 in corresponding Russian Application No. 2020114083/07(023597); 17 pages including English-language translation.

Extended European Search Report dated Aug. 4, 2021, in connection with corresponding EP Application No. 18858697.8; 8 pages.

* cited by examiner

CALCULATION BOARD POWER STAGE CIRCUIT, AND CALCULATION BOARD

CROSS-REFERENCE TO RELATED APPLICATIONS

This application is a continuation of International Application No. PCT/CN2018/107104, filed on Sep. 21, 2018, which claims the priority to Chinese Patent Application No. 201721222046.3, entitled "CALCULATION BOARD POWER STAGE CIRCUIT, POWER SUPPLY PACKAGE UNIT, AND CALCULATION BOARD", filed on Sep. 21, 2017, the entire content of the aforementioned applications are incorporated herein by reference.

FIELD

The present disclosure relates to power supply technologies, particularly to power circuits for calculation boards, power supply package units and the calculation boards.

BACKGROUND

Cryptocurrency mining is a process in which transactions for various forms of cryptocurrency are verified and added to the blockchain digital ledger. Cryptocurrency mining has grown exponentially in recent years with the increased use of cryptocurrency. Each time a cryptocurrency transaction is made, a cryptocurrency miner is responsible for ensuring the authenticity of information and updating the blockchain with the transaction. The mining process itself involves competing with other cryptocurrency miners to solve complicated mathematical problems with cryptographic hash functions that are associated with a block containing the transaction data. The first cryptocurrency miner to crack the code is rewarded by being able to authorize the transaction, and in return for the service provided, the cryptocurrency miner earns small certain amounts of cryptocurrency. In order to be competitive with other cryptocurrency miners, a cryptocurrency miner needs a computer for solving the cryptographic hash functions.

Dedicated hardware, such as cryptocurrency mining machines have been used for efficient cryptocurrency mining. These mining machines consume significant electrical power and require stable power supplies when they are operating continuously. The central component of a mining machine is the calculation board, also known as the hash board, which contains the circuits and integrated circuit chips and performs the calculations of the hash functions. Currently, mining machines mainly use DC-DC power sources. However, these power sources are often unavailable due to high demand and low supply. Therefore, alternative integrated circuit power supply chips are sometimes used in place of the DC-DC power supplies. When an alternative power supply integrated circuit chip is used in place of the DC-DC power supplies, the peripheral power circuit is often not compatible with the power supply. For each replaced power supply integrated circuit chip, the peripheral circuit may need to be revised, resulting in excessive number of different versions of the calculation board, difficulty in maintenance, and increase in cost.

SUMMARY

Certain embodiments of the present disclosure provide an auxiliary circuit and a power supply package unit for calculation boards of cryptocurrency mining machines.

One aspect of the present disclosure provides a calculation board power stage circuit. The calculation board power stage circuit includes an input circuit and an output circuit. The input circuit and the output circuit are electrically connected. The calculation board power stage circuit further includes a plurality of package pins. The plurality of package pins are respectively connected to the input circuit, the output circuit, and a power supply package unit.

In some embodiments, the package pins comprise a set of eight package pins, and at least one of the set of eight package pins is connected to the input circuit, and at least one of the set of eight package pins is connected to the output circuit.

In some embodiments, the set of the eight package pins include: a first pin for an upper tube switch control output; a second pin for a lower tube switch control output; a third pin for a power stage switching node connection and an upper tube driving circuit; a fourth pin for inputting a voltage and providing a working bias voltage for an integrated circuit chip on a calculation board; a fifth pin for a reference zero potential; a sixth pin of a DC-DC enable control; a seventh pin for the DC-DC output voltage; and an eighth pin for feedback control and adjustment of an output voltage.

In some embodiments, the input circuit comprises at least two semiconductor field effect transistors connected in series, and the semiconductor field effect transistors are electrically connected to the package pins.

In some embodiments, the output circuit is a voltage stabilizing circuit for supplying a current and a stable voltage to one or more integrated circuit chips to be powered on a calculation board.

In some embodiments, the power supply package unit comprising a power supply integrated circuit, an auxiliary circuit, and one or more control pins. The power supply integrated circuit is electrically connected to the auxiliary circuit; the auxiliary circuit outputs to at least one of the control pins; and the one or more control pins are configured to be connected to one or more package pins of a calculation board power stage circuit.

In some embodiments, each of the control pins is configured to be electrically connected to a corresponding package pin within a plurality of package pins of a calculation board power stage circuit.

An embodiment of the present disclosure provides a calculation board. The calculation board includes a power stage circuit, the power stage circuit comprising an input circuit and an output circuit that are electrically connected to each other, and a plurality of package pins that are respectively connected to the input circuit and the output circuit; a power supply package unit comprising a power supply integrated circuit, an auxiliary circuit, and one or more control pins; and an integrated circuit chip to be powered. The power supply package unit is packaged to connect with the plurality of package pins of the power stage circuit; and the integrated circuit chip is powered by the power stage circuit.

In some embodiments, the at least one chip to be powered is connected in series.

In some embodiments, the package pins of the power stage circuit comprise a set of eight package pins, and at least one of the set of eight package pins is connected to the input circuit, and at least one of the set of eight package pins is connected to the output circuit.

In some embodiments, the set of the eight package pins of the power stage circuit includes a first pin for an upper tube switch control output; a second pin for a lower tube switch control output; a third pin for a power stage switching node connection and an upper tube driving circuit; a fourth pin for inputting a voltage and providing a working bias voltage for an integrated circuit chip on a calculation board; a fifth pin for a reference zero potential; a sixth pin of a DC-DC enable control; a seventh pin for the DC-DC output voltage; and an eighth pin for feedback control and adjustment of an output voltage.

In some embodiments, the input circuit includes at least two semiconductor field effect transistors connected in series, and the semiconductor field effect transistors are electrically connected to the package pins.

In some embodiments, the output circuit power stage circuit of the power stage circuit is a voltage stabilizing circuit for supplying a current and a stable voltage to one or more integrated circuit chips to be powered on the calculation board.

In some embodiments, the auxiliary circuit of the power supply package unit outputs to one of the control pins of the power supply package unit; and the one or more control pins are connected to the one or more package pins of the calculation board power stage circuit.

In some embodiments, each of the control pins of power supply package unit is connected to a corresponding package pin within the plurality of package pins of the power stage circuit.

Another aspect of the present disclosure provides a calculation board. The calculation board includes a power stage circuit, the power stage circuit comprising an input circuit and an output circuit that are electrically connected to each other, and a plurality of package pins that are respectively connected to the input circuit and the output circuit; a power supply package unit; and an integrated circuit chip to be powered. The power supply package unit is packaged to connect with the plurality of package pins of the power stage circuit; and the integrated circuit chip is powered by the power stage circuit.

In some embodiments, the power supply package unit includes a first power supply integrated circuit and a first auxiliary circuit corresponding to the power supply integrated circuit.

In some embodiments, the power supply package unit includes a second power supply integrated circuit and a second auxiliary circuit corresponding to the power supply integrated circuit, the second power supply integrated circuit and the second auxiliary circuit replacing the first power supply integrated circuit and the first auxiliary circuit.

In another embodiment of the power circuit according to the present disclosure, the package pins include a set of eight package pins; wherein at least one of the eight package pins is connected to the input circuit, and at least one of the eight package pins is connected to the output circuit.

Certain embodiments of the present disclosure provide a calculation board power stage circuit, a power supply package unit and a calculation board, and an input circuit and an output circuit arranged on the calculation board. The input circuit and the output circuit are electrically connected to each other and connected to the package pins. By placing the power supply integrated circuit chip and its power stage circuit in the power supply package unit, and by connecting the general control pins to the package pins, various DC-DC power supplies can be made compatible to the input circuit and the output circuit. By placing high power components on the calculation board, the power supply package unit can be made small with less design difficulty and with improved heat dissipation capacity, and the stability of the power supply can be maintained.

The technical solution of the present disclosure will be further described in detail below through the accompanying drawings and embodiments.

BRIEF DESCRIPTION OF THE DRAWINGS

The present disclosure can be more clearly understood from the following drawings, in which.

DETAILED DESCRIPTION

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

It should also be understood that, for the convenience of description, the size of various parts shown are not drawn to scale.

Figure 1:
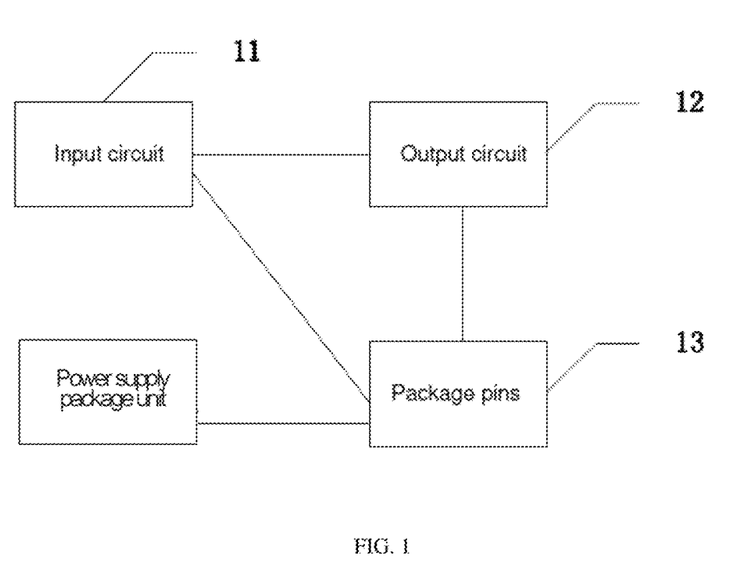
FIG. 1 is a schematic diagram of an embodiment of a calculation board power stage circuit according to the present disclosure.

FIG. 1 is a schematic structural diagram of an embodiment of a calculation board power stage circuit according to an embodiment of the present disclosure. As shown in FIG. 1, the circuit may include: the input circuit 11 and the output circuit 12 on the calculation board. The input circuit 11 and the output circuit 12 are electrically connected to each other. Package pins 13 are connected to the input circuit 11 and the output circuit 12, respectively. The package pins 13 are used to mount the packaged power supply package unit.

By placing the power supply integrated circuit chip and its auxiliary circuit in the power supply package unit, and connecting the general control pins to the package pins, various DC-DC power supplies can be made compatible to the input circuit 11 and output circuit 12. By placing high power components on the calculation board, the packaged power supply package unit can be made small with reduced design difficulty and improved heat dissipation capacity, and the stability of the power supply operation can be maintained.

In one example of the above embodiment of the calculation board power stage circuit, the package pins 13 include a set of eight package pins. The power supply package unit is connected to the input circuit 11 by at least one of eight package pins. It is also connected to the output circuit 12 by at least one of eight package pins.

In this embodiment, the package may provide eight package pins. The power supply package unit may include at least one control pin. It may be packaged on the calculation board through the connection of the control pins to the package pins. The power supply integrated circuit chip can be mounted onto the calculation board through a simple package, and the power supply package unit can be easily replaced, so that the power supply package unit of the calculation board is not limited to a specific type of power supply integrated circuit chip.

In one example of the above embodiment of the calculation board power stage circuit, the eight package pins may include: a first pin 1 for an upper tube switch control output; a second pin 2 for a lower tube switch control output; a third pin 3 for a power stage switching node connection and an upper tube driving circuit; a fourth pin 4 for inputting a voltage and providing a working bias voltage for the integrated circuit chip; a fifth pin 5 for a reference zero potential; a sixth pin 6 of the DC-DC enablement control; a seventh pin 7 for the DC-DC output voltage; and an eighth pin 8 for feedback control and adjustment of the output voltage.

In this embodiment, the first pin may be an HG pin, the second pin may be an LG pin, the third pin may be an SW pin, and the fourth pin may be a VIN pin, The fifth pin can be the GND pin, the sixth pin can be the EN pin, the seventh pin can be the DCOUT pin, and the eighth pin can be the DAOUT pin.

According to an embodiment of the calculation board power stage circuit of the present disclosure, the input circuit 11 may include at least two semiconductor field effect transistors connected in series. The two semiconductor field effect transistors may be electrically connected to the package pins.

The above embodiment provides only an example of the input circuit. In general, as long as the input circuit 11 can be used to supply a current and a discharge path for the inductor, it may be used in a calculation board power stage circuit.

According to still another embodiment of the power stage circuit of the calculation board of the present disclosure, the output circuit 12 may be a voltage stabilizing circuit for providing current and stable voltage to the integrated circuit chips to be powered on the calculation board.

The above embodiment provides an output circuit, which functions to provide current and stable voltage to the load. Particularly, it provides a supply current and stable voltage for the integrated circuit chips to be powered on the calculation board.

Figure 2:
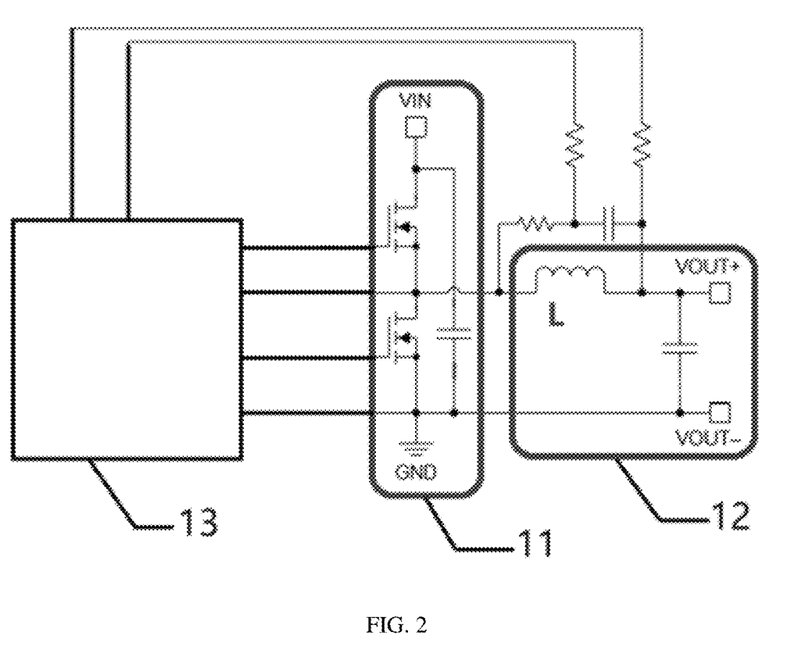
FIG. 2 is a circuit diagram of a specific example of the above embodiment of the calculation board power stage circuit of the present disclosure.

FIG. 2 is a circuit diagram of a specific example of the above embodiment of the calculation board power stage circuit of the present disclosure. As shown in FIG. 2, the input circuit 11 and the output circuit 12 may be mounted on the calculation board. The input circuit 11 and the output circuit 12 may be electrically connected. The input circuit 11 may include two semiconductor field effect transistors connected in series. The semiconductor field effect transistors may be electrically connected to the package pins 13. The package pins 13 may be used for installing the packaged power supply package unit.

Figure 3:
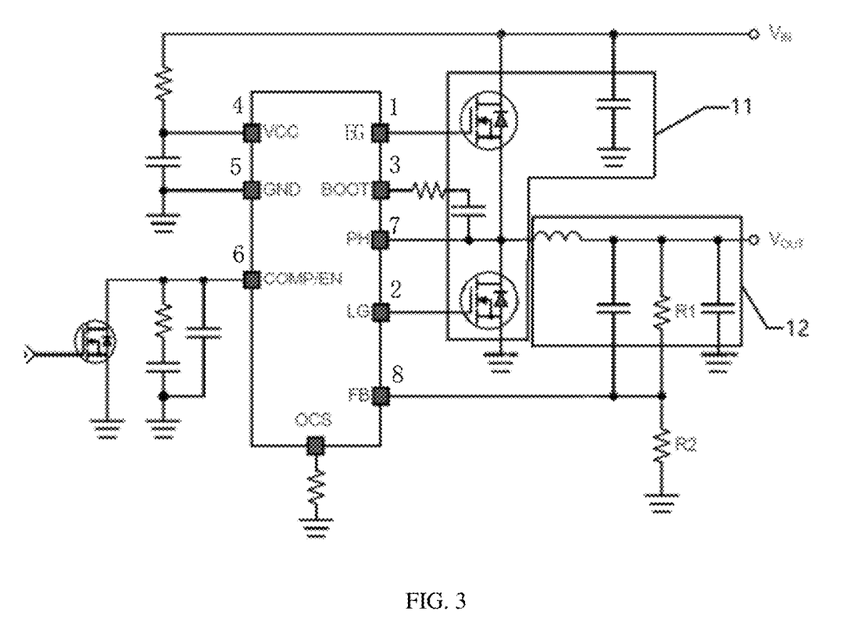
FIG. 3 is a circuit diagram of another specific example of the above embodiment of the calculation board power stage circuit of the present disclosure.

FIG. 3 is a circuit diagram of another specific example of the above embodiment of the calculation board power stage circuit of the present disclosure. As shown in FIG. 3, the input circuit 11 and the output circuit 12 on the calculation board may be electrically connected. The power stage circuit may also include a power supply package unit connected to the input circuit 11 and the output circuit 12, respectively.

Figure 4:
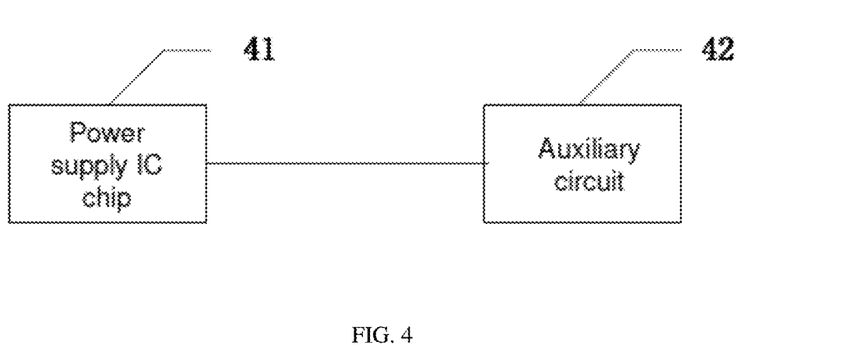
FIG. 4 is a schematic diagram of an embodiment of a power supply package unit according to the present disclosure.

FIG. 4 is a schematic structural diagram of an embodiment of a power supply package unit according to the present disclosure. As shown in FIG. 4, the apparatus of this embodiment may include a power integrated circuit chip 41 and auxiliary circuit 42 that are interconnected. The auxiliary circuit 42 may output to at least one control pin, and is connected to the package pins of the calculation board power stage circuit through each of the control pins.

The above embodiment of the present disclosure provides a packaged power supply package unit. By placing any power supply integrated circuit chip 41 in the power supply package unit, the power supply package unit can be made small with reduced design difficulty. At the same time, the embodiment can use different power supply integrated circuit chips 41 by using the proper corresponding auxiliary circuit 42, which overcomes the compatibility difficulties in calculation board power supply systems. The auxiliary circuit 42 can be customized to accommodate different power supply integrated circuit chips 41. For each power supply integrated circuit chip 41, the data sheet often provides design procedures for designing the auxiliary circuit 42 and necessary information and the order for calculating the component values in the auxiliary circuit 42. As such, a variety of power supply integrated circuit chips 41 can be made compatible to power the calculation board.

In one example of the above embodiment of the packaged power supply package unit of the present disclosure, each control pin may have a corresponding package pin in the eight package pins in the calculation board power stage circuit.

Since the power supply package unit is required to be mounted on the calculation board, the control pins of the power supply package unit may have corresponding package pins in the calculation board power stage circuit to ensure the proper mounting of the power unit to the calculation board.

In one example of the above embodiment of the power supply package unit of the present disclosure, the power supply package unit may be connected to the package pins of the calculation board power stage circuit. The power supply package unit may be connected to the package pins of the calculation board power stage circuit by connecting the control pins to corresponding package pins in the calculation board power stage circuit. By correctly connecting the control pins to the corresponding package pins, the packaged power supply package unit may be connected to the calculation board to supply power to the integrated circuit chips to be powered on the calculation board.

Figure 5:
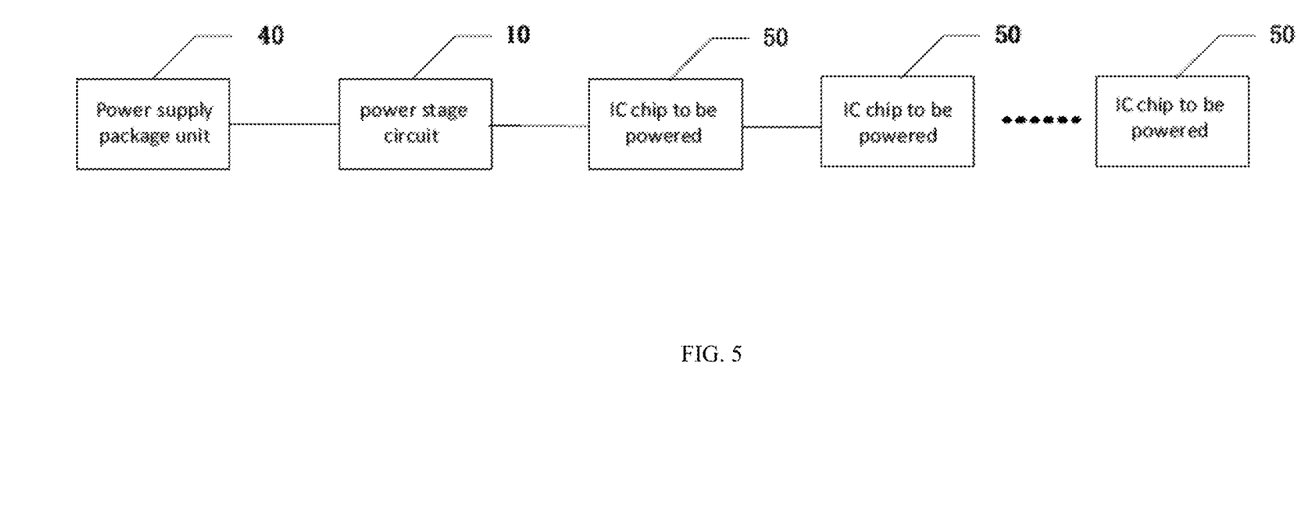
FIG. 5 is a schematic structural diagram of an embodiment of a calculation board according to the present disclosure.

FIG. 5 is a schematic structural diagram of an embodiment of a calculation board according to the present disclosure. As shown in FIG. 5, the calculation board of this embodiment may include a calculation board power stage circuit 10 of any of the above embodiments of the present disclosure, a power supply package unit 40 of any of the above embodiments of the present disclosure, and at least one integrated circuit chip 50 to be powered.

The power supply package unit 40 may be packaged within package pins of the calculation board power stage circuit 10, and may supply power to at least one integrated circuit chip 50 on the calculation board power stage circuit 10.

The above embodiment of the present disclosure provides a calculation board. By modularizing the power supply integrated circuit chip, compatibility of a plurality of power supply integrated circuit chips can be achieved. At the same time, the complexity of the modular package is reduced, and the maintenance of the calculation board becomes easier. By placing high-power components in the calculation board power stage circuit, and by installing a heat sink on the calculation board, the system can better dissipate heat, maintaining the stability of the power supply function, and reducing the difficulty in designing the calculation board. When replacing a power integrated circuit chip, there is no need to redesign the calculation board. As a result, more flexibility in hardware design may be achieved, and cost of replacement may be reduced.

In one example of the above embodiment of the calculation board of the present disclosure, at least one of the integrated circuit chips to be powered may be connected in series.

Figure 6:
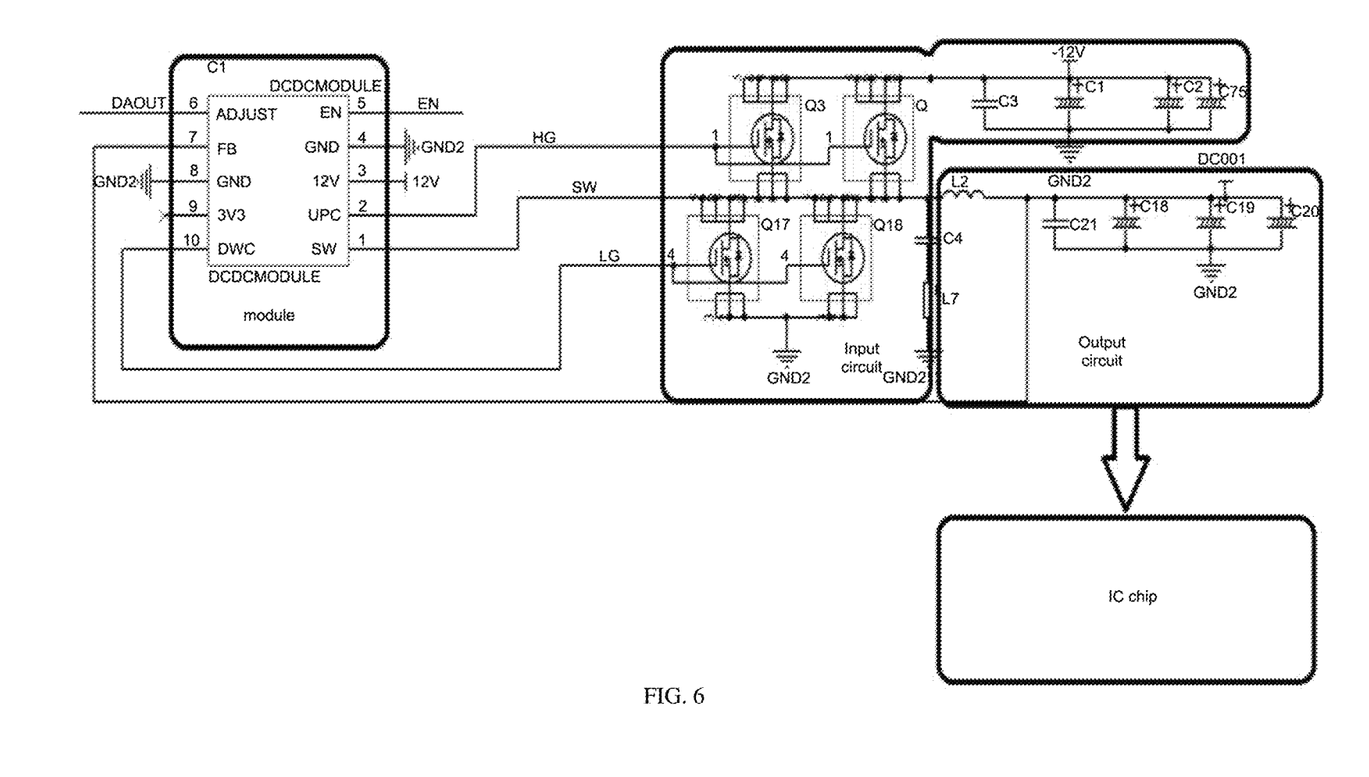
FIG. 6 is a circuit diagram of another specific example of the above embodiment of the calculation board of the present disclosure.

FIG. 6 is a circuit diagram of another example of the above embodiment of the calculation board of the present disclosure. As shown in FIG. 6, the "Module" in the figure is a power supply package unit. The input circuit and the output circuit constitute a calculation board power stage circuit. The "IC chip" in the drawing are the integrated circuit chips to be powered by the power stage circuit.

The various embodiments in the present disclosure are described in a progressive manner Each embodiment focuses on certain different aspects from other embodiments, and the same or similar aspects between the various embodiments may be referred to each other. The embodied system basically corresponds to the method embodiment, and the relevant components can be referred to the partial description of the method embodiment.

The description of the present disclosure has been presented for purposes of illustration and description. Many modifications and variations will be apparent to those skilled in the art. The embodiment was chosen and described in order to best explain the principles and embodiments of the disclosure. It will be understood by those skilled in the art that the features described in the respective embodiments and/or claims of the present disclosure can be combined in various ways, even if such combinations are not explicitly described in the present disclosure. In particular, without departing from the spirit and teaching of the present disclosure, the features described in the respective embodiments and/or claims can be combined in various ways. All of these combinations fall within the scope of the present disclosure.

While the present disclosure has been shown and described with reference to various embodiments thereof, it will be understood by those skilled in the art that various modifications in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

It should be noted that the description of the foregoing embodiments of the electronic device may be similar to that of the foregoing method embodiments, and the device embodiments have the same beneficial effects as those of the method embodiments. Therefore, details may not be described herein again. For technical details not disclosed in the embodiments of the electronic device of the present disclosure, those skilled in the art may understand according to the method embodiments of the present disclosure.

In the several embodiments provided in the present disclosure, it should be understood that the disclosed device and method may be realized in other manners. The device embodiments described above are merely exemplary. All functional modules or units in the embodiments of the present disclosure may all be integrated into one processing unit, or each unit may be used as a single unit. Two or more units may be integrated into one. The above integrated unit can either be implemented in the form of hardware, or in the form of hardware combined with software functional units.

Other embodiments of the disclosure will be apparent to those skilled in the art from consideration of the specification and practice of the disclosure provided herein. It is intended that the specification and examples be considered as exemplary only, with a true scope and spirit of the disclosure being indicated by the claims.

What is claimed is:

1. A calculation board power stage circuit, comprising:
an input circuit and an output circuit, wherein the input circuit and the output circuit are electrically connected; and
a plurality of package pins, wherein the plurality of package pins are respectively connected to the input circuit, the output circuit, and a power supply package unit,
wherein the power supply package unit comprises:
a power supply integrated circuit, an auxiliary circuit, and one or more control pins,
wherein the power supply integrated circuit is electrically connected to the auxiliary circuit the auxiliary circuit outputs to at least one of the control pins; and the one or more control pins are configured to be connected to the one or more package pins of the calculation board power stage circuit, and
wherein the auxiliary circuit is customized to adapt the power supply integrated circuit to the input circuit and the output circuit of the calculation board power stage circuit.

2. The calculation board power stage circuit of claim 1, wherein the package pins comprise a set of eight package pins, and at least one of the set of eight package pins is connected to the input circuit, and at least one of the set of eight package pins is connected to the output circuit.

3. The calculation board power stage circuit of claim 2, wherein the set of the eight package pins comprise: a first pin for an upper tube switch control output; a second pin for a lower tube switch control output; a third pin for a power stage switching node connection and an upper tube driving circuit; a fourth pin for inputting a voltage and providing a working bias voltage for an integrated circuit chip on a calculation board; a fifth pin for a reference zero potential; a sixth pin of a DC-DC enable control; a seventh pin for a DC-DC output voltage; and an eighth pin for feedback control and adjustment of an output voltage.

4. The calculation board power stage circuit of claim 1, wherein the input circuit comprises at least two semiconductor field effect transistors connected in series, and the semiconductor field effect transistors are electrically connected to the package pins.

5. The calculation board power stage circuit of claim 1, wherein the output circuit is a voltage stabilizing circuit for supplying a current and a stable voltage to one or more integrated circuit chips to be powered on a calculation board.

6. The calculation board power stage circuit of claim 1, wherein each of the control pins is configured to be electrically connected to a corresponding package pin within the plurality of package pins of a calculation board power stage circuit.

7. The calculation board power stage circuit according to claim 1, wherein the input circuit and the output circuit comprise all high power components of the calculation board power stage circuit, and the input circuit and the output circuit are mounted on a calculation board.

8. The calculation board power stage circuit according to claim 1, wherein the power supply integrated circuit and the auxiliary circuit are modularized into the power supply package unit, wherein the power supply package unit is free of any high power component, and is separated from the calculation board.

9. A calculation board, comprising:
a power stage circuit, the power stage circuit comprising an input circuit and an output circuit that are electrically connected to each other, and a plurality of package pins that are respectively connected to the input circuit and the output circuit;
a power supply package unit; and
an integrated circuit chip to be powered;
wherein the power supply package unit is packaged to connect with the plurality of package pins of the power stage circuit; and the integrated circuit chip is powered by the power stage circuit, and wherein the power supply package unit comprises:
a power supply integrated circuit, an auxiliary circuit, and one or more control pins,
wherein the power supply integrated circuit is electrically connected to the auxiliary circuit; the auxiliary circuit outputs to at least one of the control pins; and the one or more control pins are configured to be connected to the one or more package pins of the power stage circuit, and
wherein the auxiliary circuit is customized to adapt the power supply integrated circuit to the input circuit and the output circuit of the power stage circuit.

10. The calculation board according to claim 9, wherein the power supply package unit comprises a first power supply integrated circuit and a corresponding first auxiliary circuit customized to adapt the power supply integrated circuit to the input circuit and the output circuit of the power stage circuit.

11. The calculation board according to claim 10, wherein the first power supply integrated circuit and the first auxiliary circuit are mounted to enable being replaced by a second power supply integrated circuit and a second auxiliary circuit.

12. The calculation board according to claim 11, wherein the first power supply integrated circuit and the first auxiliary circuit are modularized into a first package unit, and the first package is mounted to allow for being replaced by a second package unit in which the second power supply integrated circuit and the second auxiliary circuit are modularized.

13. The calculation board according to claim 9, wherein when there are two or more chips to be powered, at least two of the chips to be powered are connected in series.

14. The calculation board according to claim 9, wherein the package pins of the power stage circuit comprise a set of eight package pins, and at least one of the set of eight package pins is connected to the input circuit, and at least one of the set of eight package pins is connected to the output circuit.

15. The calculation board according to claim 14, wherein the set of the eight package pins of the power stage circuit comprise: a first pin for an upper tube switch control output; a second pin for a lower tube switch control output; a third pin for a power stage switching node connection and an upper tube driving circuit; a fourth pin for inputting a voltage and providing a working bias voltage for an integrated circuit chip on a calculation board; a fifth pin for a reference zero potential; a sixth pin of a DC-DC enable control; a seventh pin for a DC-DC output voltage; and an eighth pin for feedback control and adjustment of an output voltage.

16. The calculation board according to claim 9, wherein the input circuit comprises at least two semiconductor field effect transistors connected in series, and the semiconductor field effect transistors are electrically connected to the package pins.

17. The calculation board according to claim 9, wherein the output circuit power stage circuit of the power stage circuit is a voltage stabilizing circuit for supplying a current and a stable voltage to one or more integrated circuit chips to be powered on the calculation board.

18. The calculation board according to claim 9, wherein each of the control pins of power supply package unit is connected to a corresponding package pin within the plurality of package pins of the power stage circuit.

19. The calculation board according to claim 9, wherein the input circuit and the output circuit comprise all high power components of the power stage circuit of the calculation board.

20. The calculation board according to claim 9, wherein the power supply integrated circuit and the auxiliary circuit are modularized into the power supply package unit, wherein the power supply package unit is free of any high power component, and is separated from the calculation board.

* * * * *